(12) United States Patent
Okamoto

(10) Patent No.: US 10,148,130 B2
(45) Date of Patent: Dec. 4, 2018

(54) NON-CONTACT POWER SUPPLY SYSTEM

(71) Applicant: Nissan Motor Co., Ltd., Yokohama-shi, Kanagawa (JP)

(72) Inventor: Tomofumi Okamoto, Kokubunji (JP)

(73) Assignee: Nissan Motor Co., Ltd., Yokohama (JP)

( * ) Notice: Subject to any disclaimer, the term of this patent is extended or adjusted under 35 U.S.C. 154(b) by 154 days.

(21) Appl. No.: 15/210,261

(22) Filed: Jul. 14, 2016

(65) Prior Publication Data
US 2017/0005522 A1 Jan. 5, 2017

Related U.S. Application Data

(62) Division of application No. 14/769,502, filed as application No. PCT/JP2014/055740 on Mar. 6, 2014, now Pat. No. 9,502,908.

(30) Foreign Application Priority Data

Mar. 29, 2013 (JP) .................................. 2013-072241

(51) Int. Cl.
*H02J 50/10* (2016.01)
*H02J 50/12* (2016.01)
(Continued)

(52) U.S. Cl.
CPC ............. *H02J 50/12* (2016.02); *B60L 11/182* (2013.01); *B60L 11/1829* (2013.01);
(Continued)

(58) Field of Classification Search
CPC .......... H02J 50/80; H02J 17/00; H02J 7/0029; H02J 50/10; H02J 5/005; H02J 7/025;
(Continued)

(56) References Cited

U.S. PATENT DOCUMENTS 6,184,651 B1* 2/2001 Fernandez .............. H02J 7/025
320/108
7,999,417 B2* 8/2011 Kato ....................... H01F 38/14
307/149
(Continued)

FOREIGN PATENT DOCUMENTS

GB 2292866 A 3/1996
JP 8-33338 A 2/1996
(Continued)

*Primary Examiner* — Daniel Kessie
(74) *Attorney, Agent, or Firm* — Global IP Counselors, LLP

(57) ABSTRACT

A non-contact power supply system has a conversion circuit that converts power of a power transmission-side power supply, and outputs power to a power transmission coil. A power transmission-side controller controls the conversion circuit. A power reception coil receives power from the power transmission coil in a non-contact manner. The power reception coil supplies power to a load electrically connected to the power reception coil. A smoothing circuit smooths power received by the power reception coil. A sensor detects current or voltage in the smoothing circuit. A power reception-side controller acquires an encoded value from a detection value of the sensor. The power transmission-side controller measures an elapsed time between a previous rise and a current rise in a detection voltage that is detected by the sensor, and compares the elapsed time and an elapsed time threshold that is set in advance to acquire the encoded value.

7 Claims, 19 Drawing Sheets

(51) Int. Cl.
*H02J 50/80* (2016.01)
*H02J 17/00* (2006.01)
*B60L 11/18* (2006.01)
*H02J 7/00* (2006.01)
*H02J 7/02* (2016.01)

(52) U.S. Cl.
CPC ....... *B60L 11/1833* (2013.01); *B60L 11/1838* (2013.01); *H02J 7/0029* (2013.01); *H02J 7/025* (2013.01); *H02J 17/00* (2013.01); *H02J 50/10* (2016.02); *H02J 50/80* (2016.02); *B60L 2210/30* (2013.01); *B60L 2210/40* (2013.01); *B60L 2240/80* (2013.01); *H02J 2007/0037* (2013.01); *H02J 2007/0096* (2013.01)

(58) Field of Classification Search
CPC ...... H02J 2007/0037; H02J 2007/0096; B60L 11/182; B60L 11/1829
USPC ........................................................ 307/104
See application file for complete search history.

(56) References Cited

U.S. PATENT DOCUMENTS

| | | | | |
|---|---|---|---|---|
| 9,114,717 | B2* | 8/2015 | Yamamoto | B60L 5/005 |
| 9,356,659 | B2* | 5/2016 | Partovi | H02J 7/025 |
| 9,722,447 | B2* | 8/2017 | Partovi | H02J 7/025 |
| 9,866,040 | B2* | 1/2018 | Kato | H02J 50/60 |
| 2002/0022454 | A1* | 2/2002 | Serra | H04B 5/0012 |
| | | | | 455/41.1 |
| 2006/0041420 | A1 | 2/2006 | Martin et al. | |
| 2008/0157603 | A1* | 7/2008 | Baarman | H02J 7/025 |
| | | | | 307/104 |
| 2011/0109263 | A1* | 5/2011 | Sakoda | B60L 11/182 |
| | | | | 320/108 |
| 2011/0140538 | A1* | 6/2011 | Jung | H02J 7/0027 |
| | | | | 307/104 |
| 2012/0212074 | A1* | 8/2012 | Uchida | H02J 17/00 |
| | | | | 307/104 |
| 2012/0235508 | A1 | 9/2012 | Ichikawa | |
| 2013/0026849 | A1* | 1/2013 | Ohta | G06F 1/12 |
| | | | | 307/104 |
| 2013/0076153 | A1* | 3/2013 | Murayama | H02J 7/025 |
| | | | | 307/104 |
| 2013/0099590 | A1* | 4/2013 | Ma | H02M 3/3388 |
| | | | | 307/104 |
| 2013/0147279 | A1* | 6/2013 | Muratov | H02J 5/005 |
| | | | | 307/104 |
| 2013/0241280 | A1* | 9/2013 | Hoyer | B60R 16/03 |
| | | | | 307/9.1 |
| 2013/0260676 | A1* | 10/2013 | Singh | H04B 5/0037 |
| | | | | 455/41.1 |
| 2013/0320759 | A1* | 12/2013 | Abe | H01F 38/14 |
| | | | | 307/10.1 |
| 2014/0009082 | A1* | 1/2014 | King | H05B 37/02 |
| | | | | 315/247 |
| 2015/0108847 | A1* | 4/2015 | Taylor | H02J 50/12 |
| | | | | 307/104 |

FOREIGN PATENT DOCUMENTS

| | | |
|---|---|---|
| JP | 9-163756 A | 6/1997 |
| JP | 2002-252579 A | 9/2002 |
| JP | 2011-3977 A | 1/2011 |
| JP | 2011-199927 A | 10/2011 |

\* cited by examiner

NON-CONTACT POWER SUPPLY SYSTEM

This application is a divisional application of U.S. patent application Ser. No. 14/769,502 filed on Aug. 21, 2015. U.S. patent application Ser. No. 14/769,502 is a U.S. National stage application of International Application No. PCT/JP2014/055740, filed Mar. 6, 2014, which claims priority to Japanese Patent Application No. 2013-072241 filed in Japan on Mar. 29, 2013. The entire disclosures of U.S. patent application Ser. No. 14/769,502 and Japanese Patent Application No. 2013-072241 are hereby incorporated herein by reference.

BACKGROUND

Field of the Invention

The present invention relates to a non-contact power supply system.

Background Information

A power transmission side coil is disposed in the vicinity of a power reception side coil and a power reception side coil is disposed in the vicinity of the power supply side coil, which are opposedly positioned with an air gap of about only a few cm, upon the power supply. The transmission side coil is made of a two-phase winding coil with axes that are 90 degrees offset; a two-phase carrier AC with phases that are shifted 90 degrees is applied thereto, generating a rotating magnetic field, which modulates the signal, and an electromagnetic wave on which is placed the modulation signal that is emitted. The reception side coil is made of a single phase coil or a two-phase winding coil; an electromagnetic wave enters therein based on the mutual induction effect of electromagnetic induction to induce a modulation signal. A coil communication device for a non-contact power supply device which performs communication by the above between a power transmission coil and a power reception coil has been disclosed. (see, Japanese Laid-Open Patent Application No. 2011-003977).

SUMMARY

However, when the coil communication device described above is provided to a non-contact power supply device, there is the problem that a power transmission side coil and a power reception side coil which configure a communication circuit for communication have to be provided separate from a power supply side coil and a power reception side coil which configure the main circuit for the power supply.

The problem to be solved by the present invention is to provide a non-contact power supply system that is able to transmit information between the power transmission side and the reception side, without separately providing a coil for communication other than a coil for the power supply.

The present invention solves the problem, in a non-contact power supply system that supplies power in a non-contact manner between a power transmission coil and a power reception coil, by transmitting encoded information from the power transmission side to the power reception side by controlling a current value or an output time of an output current from a conversion means provided on the power transmission side to the power transmission coil, and receiving said information by acquiring an encoded value from a detection value of a current or a voltage of a smoothing means provided on the power reception side.

Since the present invention utilizes a power transmission coil for transmitting power from a power source in a non-contact manner, and a power reception coil for receiving the power from the power transmission coil and supplying the same to a load, the effect that information can be transmitted between the power transmission side and the reception side, without separately providing a coil for communication other than the power transmission coil and the power reception coil, is achieved.

BRIEF DESCRIPTION OF THE DRAWINGS

Referring now to the attached drawings which form a part of this original disclosure.

DETAILED DESCRIPTION OF THE EMBODIMENTS

Embodiments of the present invention will be explained below based on the drawings.

First Embodiment

Figure 1:
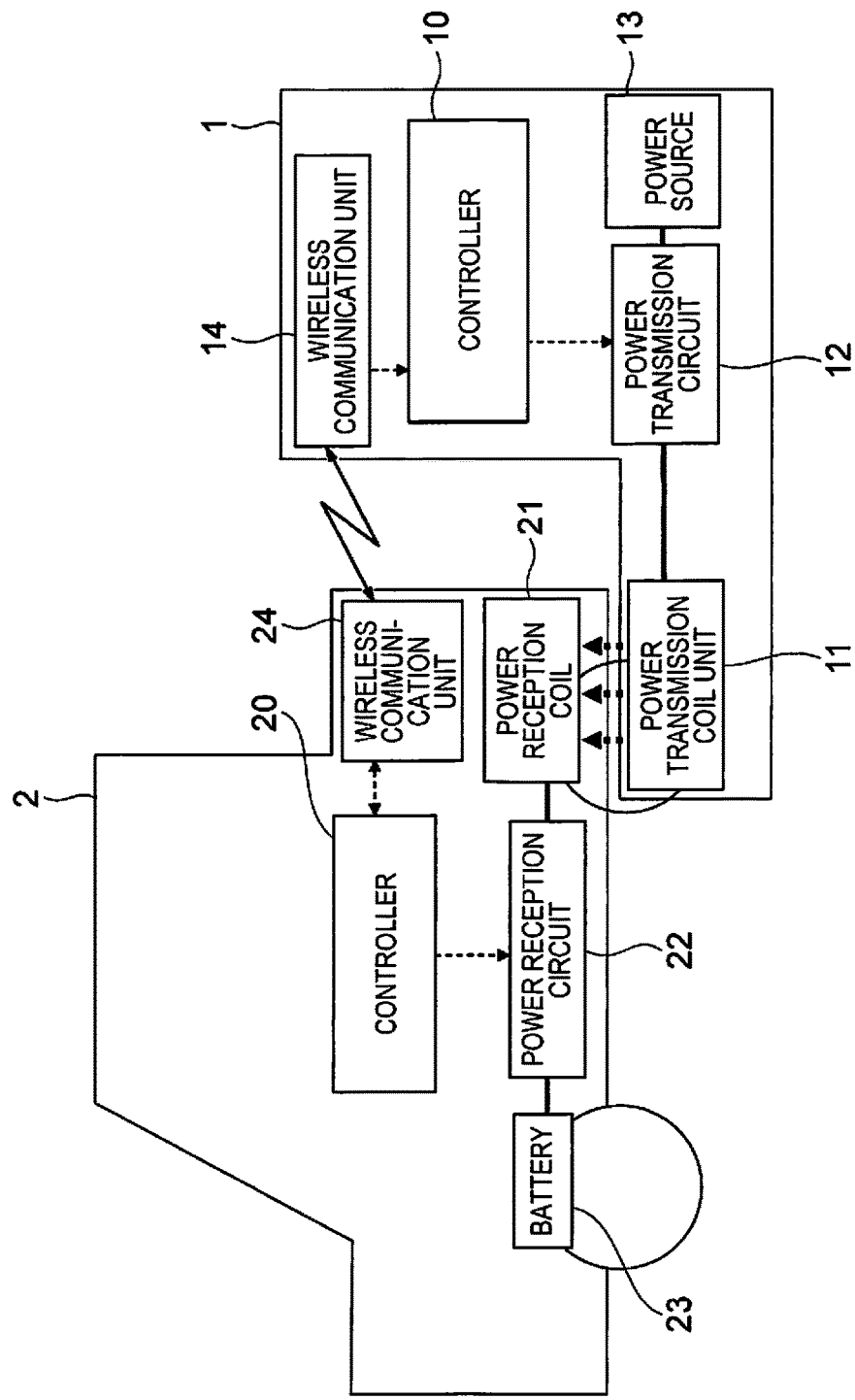
FIG. 1 is a control block diagram view of a non-contact power supply system according to an embodiment of the present invention.

FIG. 1 is a block diagram of a non-contact power supply system according to an embodiment of the present invention. The non-contact power supply system of the present embodiment supplies power in a non-contact manner from a power transmission coil unit 11 of a power supply device 1 provided on the ground side to a power reception coil unit 21 on the vehicle side, by means of at least a magnetic coupling. The system then charges a battery 23 of the vehicle 2 by the power that is received by the power reception coil unit 21.

Non-contact power supply systems are provided to parking facilities such as parking spaces of homes and shared facilities such as the parking space of a highway. A non-contact power supply system comprises a vehicle 2 and a power supply device 1. The power supply device 1 is provided to a parking space for parking a vehicle 2, and is a ground side unit that supplies power by non-contact power supply between coils, when the vehicle 2 is parked in a predetermined parking position. The vehicle 2 is a vehicle 2 that is capable of charging a battery that is provided in the vehicle by an external power source, such as an electric vehicle or a plug-in hybrid vehicle. Of the non-contact power supply system of the present embodiment, the system on the power transmission side is not limited to a device installed in a parking space, and may be provided to another device; in addition, the system on the power reception side may be provided to a device other than a vehicle.

The configuration of the power supply device 1 and the vehicle 2, which configure the non-contact power supply system, will be described below. In the present embodiment, a description will be given of an electric vehicle as the vehicle 2. In FIG. 1, the dotted arrows represent respective signal lines between the controllers 10, 20, and the configuration in the power supply device 1 and the configuration in the vehicle 2, and the thick lines represent power lines.

The power supply device 1 comprises the controller 10, a power transmission coil unit 11, a power transmission circuit 12, a power source 13, and a wireless communication unit 14.

The controller 10 is a main controller for controlling the power transmission circuit 12 and the wireless communication unit 14, and for controlling the entire power supply device 1. The power transmission coil unit 11 supplies power in a non-contact manner to the power reception coil unit 21, which is provided on the side with the vehicle 2, comprises a parallel circular shape coil, and is provided in a parking space in which is provided the non-contact power supply device of the present embodiment.

The power transmission circuit 12 is a circuit for converting the power supplied from the power source to a high frequency AC power and transmitting the same to the power transmission coil unit 11. The power source 13 is a power source for supplying power to the power transmission circuit 12. The power source 13 may be an external power source of the power supply device 1; for example, a home AC power source may be used.

The wireless communication unit 14 is a transceiver that performs bidirectional communication with a wireless communication unit 24 that is provided on the vehicle 2 side. A frequency that is different from the frequency that is used in vehicle peripherals, such as intelligent keys, is set as the communication frequency between the wireless communication unit 14 and the wireless communication unit 24 so that vehicle peripherals are less susceptible to interference by the communication even if communication is performed between the wireless communication unit 14 and the wireless communication unit 24. For example, various wireless LAN systems are used for the communication between the wireless communication unit 14 and the wireless communication unit 24.

The configuration of the vehicle 2 is described next. The vehicle 2 comprises a controller 20, a power reception coil unit 21, a power reception circuit 22, a battery 23, and a wireless communication unit 24.

The controller 20 is a controller for controlling the power reception circuit 22 and the wireless communication unit 24, and for performing various controls in the EV system of the vehicle.

The power reception coil unit 21 is provided on the bottom surface (chassis), etc., of the vehicle 2 between the rear wheels. Then, when the vehicle 2 is parked in the predetermined parking position, the power reception coil unit 21 is positioned above the power transmission coil unit 11, while maintaining the distance from the power transmission coil unit 11. The power reception coil unit 21 comprises a circular shape coil that is parallel to the surface of the parking space.

The power reception circuit 22 is a circuit connected between the power reception coil unit 21 and the battery 23, smoothens the AC power that is received by the power reception coil unit 21 to DC power, and supplies power to the battery 23. The battery 23 is charged by the power from the power reception circuit 22, and is one of the loads of the vehicle 2. The battery 23 is also a secondary battery that outputs, via an inverter that is not diagrammed, power to a motor (not shown), which is the power source of the vehicle 2. The battery 23 is configured by connecting a plurality of secondary batteries such as lithium-ion batteries in series or in parallel.

The wireless communication unit 24 is a communication device for performing wireless communication with the wireless communication unit 14 on the power supply device 1 side.

Figure 2:
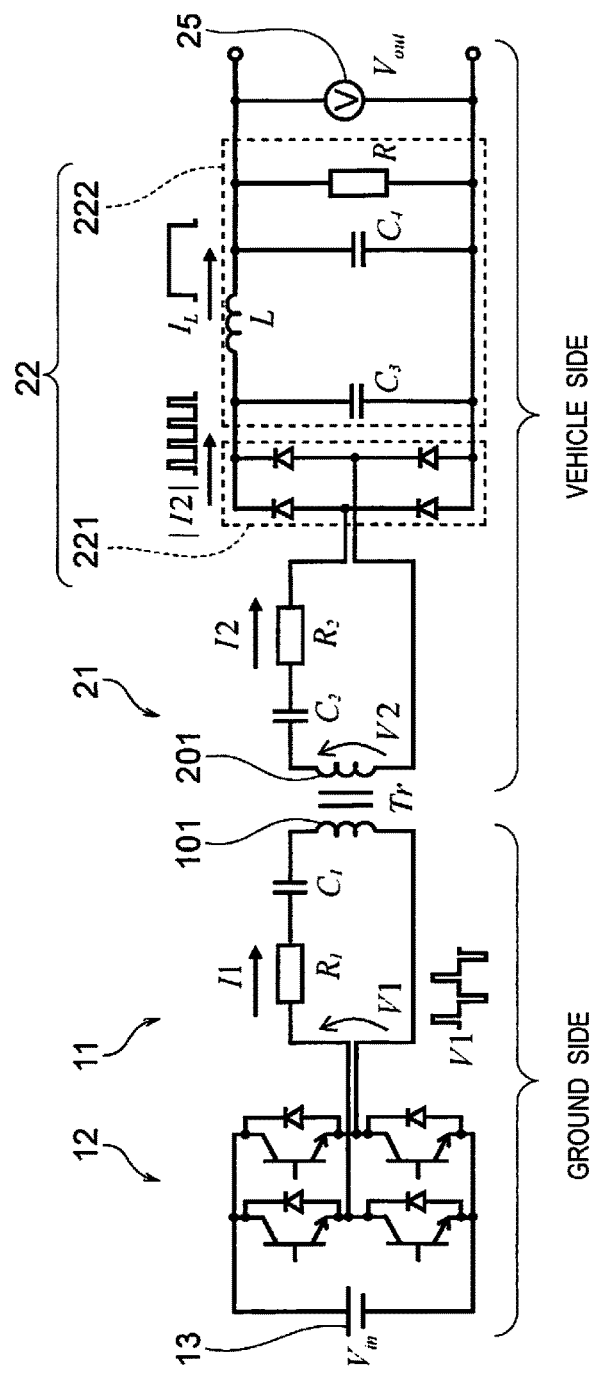
FIG. 2 is a circuit diagram of the non-contact power supply system of FIG. 1.

The circuit configuration of the non-contact power supply system of the present embodiment will be described next, using FIG. 2. FIG. 2 is a circuit view of the non-contact power supply system. An inverter that configures the power transmission circuit 12 is connected to a pair of power lines that are connected to the two terminals of the power source 13. The inverter comprises a plurality of switching elements that are connected to form a full bridge, and diodes that are each connected in parallel with respect to the plurality of switching elements. The diodes are connected to be reversed with respect to the conduction direction of the switching elements. Then, the diodes are connected to the power transmission coil unit 11 from the connection points (neutral points) of the switching elements, which are connected in series. The power transmission circuit 12 converts the power of the power source 13 to a high frequency power and outputs the same to the power transmission coil unit 11, by switching the ON/OFF of the switching elements based on a control signal of the controller 10.

The power transmission coil unit 11 comprises a resistor $R_1$, a capacitor $C_1$, and a primary coil 101. The resistor $R_1$, the capacitor $C_1$, and the primary coil 101 are connected in series, and form an RLC series circuit. A transformer is formed from a primary coil 101 and a secondary coil 201.

The power reception coil unit 21 comprises a resistor $R_2$, a capacitor $C_2$, and a secondary coil 201. The resistor $R_2$, the capacitor $C_2$, and the secondary coil 201 are connected in series, and form an RLC series circuit.

The power reception circuit 22 comprises a rectifier circuit 221 and a filter 222. The rectifier circuit 221 rectifies the AC current that is outputted from the power reception coil unit 21 and outputs the same to the filter 222. The rectifier circuit 221 is formed from a plurality of diodes that are connected to form a full bridge, and is connected between the power reception coil unit 21 and the filter 222. The filter 222 is a circuit for filtering the output of the rectifier circuit 221. The filter 222 is configured by connecting two capacitors ($C_3$, $C_4$) in parallel between a pair of power lines, connecting a coil (L) between the two capacitors ($C_3$, $C_4$), and connecting a discharge resistor (R) in parallel with respect to the capacitor ($C_4$), which is positioned on the output side among the two capacitors ($C_3$, $C_4$). The discharge resistor (R) is a resistor for discharging the electric charge of the capacitor ($C_4$).

A voltage sensor 25 is connected for detecting the voltage of the capacitor ($C_4$) of the filter 222.

The control of the controllers 10 and 20 upon charging the battery 23 by the non-contact power supply system of the present embodiment will be described next, using FIGS. 1 and 2. When the vehicle 2 is parked in a parking space supplied with the power supply device 1, the power reception coil unit 21 faces the power transmission coil unit 11.

The controller 20 on the vehicle side transmits a request signal for the non-contact power supply to the power supply device 1 with the wireless communication unit 24. The controller 10 on the power supply device side starts the supply of power by receiving the request signal from the wireless communication unit 14. The controller 10 outputs the desired power from the power transmission coil unit 11 to the power reception coil unit 21 by switching the switching elements of an inverter circuit that is included in the power transmission circuit 12. Then, the controller 20 controls the power reception circuit 22 to supply to the battery 23 power that is suitable for charging the battery 23, in accordance with the state of the battery 23.

During charging of the battery 23, the controller 20 transmits to the power supply device 1 the required power, etc., with respect to the power supply device 1, in accordance with the state of the battery 23. Then, the controller 10 controls the power transmission circuit 12 in accordance with the required power of the vehicle side.

At this time, the controller 20 on the vehicle side must perform wireless communication after identifying the individual information of the power supply device 1 that receives power. That is, the controller 20 on the vehicle side must acquire the individual information (identification information) of the power supply device 1 before charging the battery 23 by the non-contact power supply, and transmit the information to the wireless communication units 14 and 24 based on the acquired individual information. Thus, in the present invention, communication is performed by using excitation communication between the power transmission coil unit 11 and the power reception coil unit 21.

Figure 3:
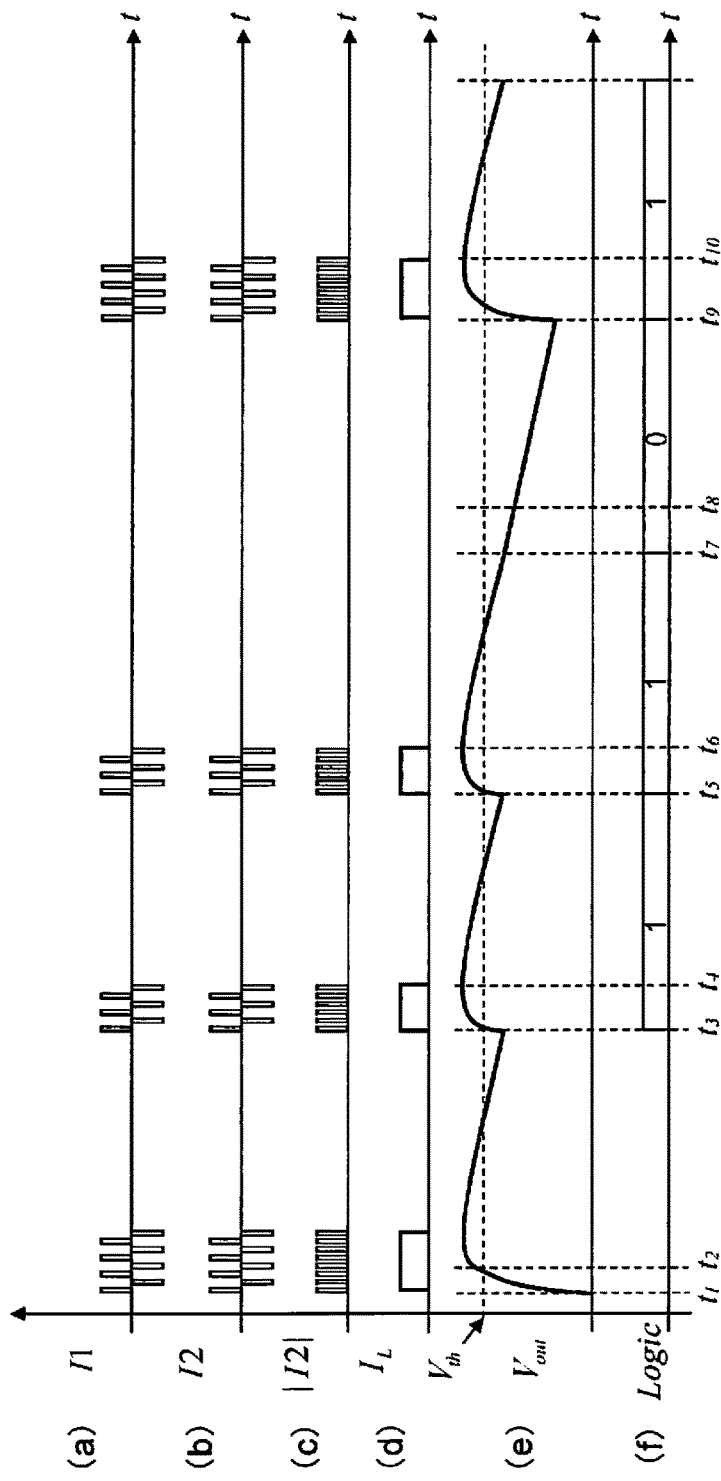
FIG. 3 is a series of graphs illustrating (a) the characteristics of the current that flows in the resistor ($R_1$), (b) the characteristics of the current that flows in the resistor ($R_2$), (c) the characteristics of the output current of the rectifier circuit, (d) the characteristics of the current that flows in the coil (L), (e) the characteristics of the detection voltage of the voltage sensor, and (f) the characteristics of the digital value that is determined based on the detection voltage, in the circuit view of FIG. 2

The excitation communication between the power transmission coil unit 11 and the power reception coil unit 21 will be described below using FIG. 1-FIG. 3. In FIG. 3, graph (a) is a graph illustrating the characteristics of the current that flows in the resistor ($R_1$) of the power transmission coil unit 11, graph (b) is a graph illustrating the characteristics of the current that flows in the resistor ($R_2$) of the power reception coil unit 21, graph (c) is a graph illustrating the characteristics of the output current of the rectifier circuit 221, graph (d) is a graph illustrating the characteristics of the current that flows in the coil (L) of the filter 222, graph (e) is a graph illustrating the characteristics of the detection voltage of the voltage sensor 25, and graph (f) is a graph illustrating the characteristics of the digital value that is determined based on the detection voltage. The horizontal axis (t) of the graphs (a)-(f) represents the time axis.

The individual information of the power supply device 1 is stored in a memory (not shown) in advance as encoded information. When a plurality of power supply devices 1 are installed in each parking space, the encoded information stored in the memory is set to be different for each power supply device 1. The encoded information is represented by encoded digital values (in other words, discretized values) represented by "0" and "1". For example, between adjacent power supply devices 1, a value encoded as "0001" is appended to one power supply device 1 and a value encoded as "0010" is appended to the other power supply device 1.

The controller on the power supply device 1 side controls the output current from the power transmission circuit 12 in accordance with the encoded information described above. For example, the controller 10 controls the switching element of the power transmission circuit 12 so that the output current ($I_1$) of the power transmission circuit 12, when combining the positive side and the negative side, will become eight pulses (intermittent), as illustrated in FIG. 3.

At this time, the current ($I_2$) that flows in the resistor ($R_2$) of the power reception coil unit 21 will have a waveform corresponding to the current ($I_1$), as illustrated in graph (b) of FIG. 3. Then, with the current ($I_2$) being rectified by the rectifier circuit 221, the waveform of the output current ($I_2$) of the rectifier circuit 221 will become eight pulses on the positive side, as illustrated in graph (c) of FIG. 3.

Due to the effects of the LC circuit of the capacitor ($C_3$) and the coil (L) of the filter 222, the waveform of the current ($I_L$) of the coil (L) will become a long pulse that corresponds to a total pulse equivalent to the eight pulses, as illustrated in graph (d) of FIG. 3. In addition, with the current ($I_L$) flowing in the capacitor ($C_4$), an electric charge is accumulated in the capacitor ($C_4$), and the detection voltage of the voltage sensor 25 rises, as illustrated in graph (e).

Thus, the detection voltage of the voltage sensor 25 can be increased, by the controller 10 controlling the power transmission circuit 12 so that the waveform of the output current ($I_1$) becomes a plurality of pulses. Furthermore, the breadth of increase of the detection voltage of the voltage sensor 25 becomes greater as the number of pulses of the output current ($I_1$) increases. Then, if the output current ($I_1$) is set to zero, the voltage of the capacitor ($C_4$) will be discharged by the discharge resistor R and the detection voltage ($V_{out}$) will decrease.

The controller 10 uses the characteristics described above to transmit information that is saved in the memory to the vehicle side, by controlling the current value (corresponding to the number of pulses) of the output current from the power transmission circuit 12 to the power transmission coil unit 11.

The control of the controllers 10 and 20 when transmitting the encoded information "1101" from the ground side (the power supply device side) to the vehicle side will be described as an example.

When a signal for performing excitation communication from the vehicle is received by the wireless communication unit 14, the controller 10 causes a current corresponding to the start bit to be outputted from the power transmission circuit 12 to the power transmission coil unit 11. The start bit is a signal that is transmitted in a step prior to transmitting the encoded information, and is a signal for achieving synchronization between the controller 10 and the controller 20.

In order to transmit the start bit, the controller 10 controls the power transmission circuit 12 so that four periodic pulses are output from each of the positive side and the negative side as the output current ($I_1$). The number of pulses of the output current ($I_1$) upon transmitting the start bit is standardized between the plurality of power supply devices.

When a current corresponding to the start bit is outputted from the power transmission circuit 12, the detection voltage ($V_{out}$) of the voltage sensor 25 begins to rise from the point in time of time ($t_1$) illustrated in FIG. 3.

A voltage threshold ($V_{th}$) for identifying the start bit and the encoded information is set in advance in the controller 20. Then, the controller 20 identifies the start bit and the encoded information by comparing the detection voltage ($V_{out}$) and the voltage threshold ($V_{th}$).

The controller 20 detects the voltage of the capacitor ($C_4$) with the voltage sensor 25 after transmitting a signal to request an excitation communication. Then, when the detection voltage of the voltage sensor 25 becomes higher than the voltage threshold ($V_{th}$), the controller 20 determines that the start bit has been detected. In the example illustrated in FIG. 3, the detection voltage ($V_{out}$) becomes higher than the voltage threshold ($V_{th}$) at the point in time of time ($t_2$), and the controller 20 determines that the start bit has been received.

When receiving the start bit, the controller 20 compares the detection voltage ($V_{out}$) and the voltage threshold ($V_{th}$) from the time of receiving the start bit (time ($t_2$) in FIG. 3), at a predetermined cycle. Then, the controller 20 determines the case in which the detection voltage ($V_{out}$) is higher than the voltage threshold ($V_{th}$) as "1," and determines the case in which the detection voltage ($V_{out}$) is equal to or less than the voltage threshold ($V_{th}$) as "0." The controller 20 thereby acquires the encoded values "0" and "1" from the detection value of the voltage sensor 25.

In addition, the output cycle of the output current ($I_1$) on the power supply device side and the detection cycle of the encoded values on the vehicle side are the same cycle, and are set in advance. Accordingly, when the reception timing of the start bit is detected by the controller 20 on the vehicle side, synchronization can be achieved between the vehicle side and the power supply device side.

In order to transmit "1" at the point in time of time ($t_3$), the controller 10 controls the power transmission circuit 12 so that three periodic pulses are output from each of the positive side and the negative side as the output current ($I_1$).

The controller 20 acquires the encoded value "1" by detecting that the detection voltage ($V_{out}$) is higher than the voltage threshold ($V_{th}$) at the point in time of time ($t_4$).

Next, the controller 10 outputs an output current ($I_1$) in the same way, at the point in time of time ($t_5$) after a predetermined period from time ($t_3$). The controller 10 acquires the encoded value "1" by detecting that the detection voltage ($V_{out}$) is higher than the voltage threshold ($V_{th}$) at the point in time of time ($t_6$).

The controller 10 sets the output current ($I_1$) to zero at the point in time of time ($t_7$) after a predetermined period from time ($t_5$), in order to transmit a "0." The controller 10 compares the detection voltage ($V_{out}$) and the voltage threshold ($V_{th}$) at a timing ($t_8$) of a synchronized predetermined period. The controller 10 acquires the encoded value "0," since the detection voltage ($V_{out}$) is lower than the voltage threshold ($V_{th}$) at the point in time of time ($t_8$).

Then, the controller 10 outputs an output current ($I_1$) for transmitting the encoded value "1", at the point in time of time ($t_9$) after a predetermined period from time ($t_7$).

At this time, when transmitting the encoded value "1" after transmitting the encoded value "0," the capacitor ($C_4$) is not charged but continues to be discharged during the transmission period of the encoded value "0" so the voltage drop of the detection voltage ($V_{out}$) becomes higher. Accordingly, the detection voltage ($V_{out}$), upon starting to rise at time ($t_9$), is lower than the detection voltage at other timings ($t_3$ or $t_5$). Accordingly, the number of pulses of the output current ($I_1$) is increased in order to increase the detection voltage at the point in time of time ($t_{10}$).

That is, when transmitting a "1" after a "0," the controller 10 sets the number of pulses of the output current ($I_1$) to be greater than the number of pulses when transmitting a "1" after a "1."

The controller 10 acquires the encoded value "1" by detecting that the detection voltage ($V_{out}$) is higher than the voltage threshold ($V_{th}$) at the point in time of time ($t_{10}$). The controller 20 thereby receives the individual information of the power supply device 1 by acquiring the encoded value "1101."

Figure 4:
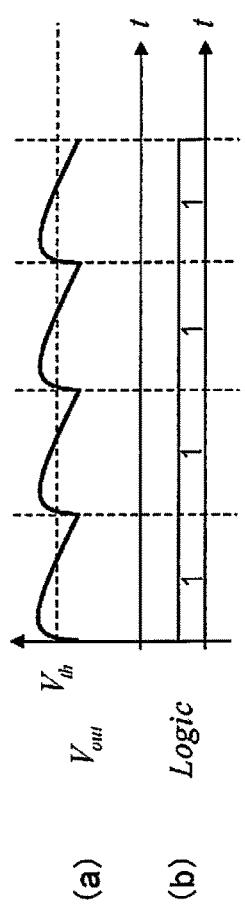
FIG. 4 is a series of graphs illustrating (a) the characteristics of the detection voltage of the voltage sensor, and (b) the characteristics of the digital value that is determined based on the detection voltage, in the circuit view of FIG. 2.
Figure 5:
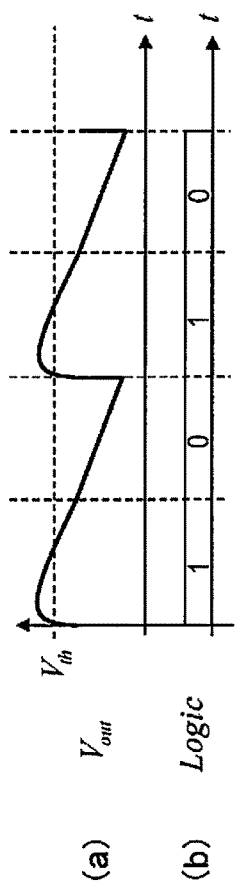
FIG. 5 is a series of graphs illustrating (a) the characteristics of the detection voltage of the voltage sensor, and (b) the characteristics of the digital value that is determined based on the detection voltage, in the circuit view of FIG. 2.

As another example of an encoded value, when transmitting "1111" from the power supply side to the vehicle side, the detection voltage ($V_{out}$) transitions with respect to the voltage threshold ($V_{th}$) as illustrated in FIG. 4. Additionally, when transmitting "1010" from the power supply side to the vehicle side, the detection voltage ($V_{out}$) transitions with respect to the voltage threshold ($V_{th}$) as illustrated in FIG. 5. Graph (a) of FIG. 4 and graph (a) of FIG. 5 are graphs illustrating the characteristics of the detection voltage of the voltage sensor 25, and graph (b) of FIG. 4 and graph (b) of FIG. 5 are graphs illustrating the characteristics of the digital value that is determined based on the detection voltage.

The controller 10 transmits a signal for error determination after transmitting the encoded information that corresponds to the individual information of the power supply device 1. The signal for error determination is the same as when transmitting the individual information of the power supply device 1 described above, and the controller 10 causes a plurality of pulsed currents to be outputted from the power transmission circuit 12 to the power transmission coil unit 11, as the output current ($I_1$).

The controller 20 receives the signal for error determination with the same method as when acquiring the encoded value described above. Then, the controller 20 performs error determination based on the received signal and determines whether or not there is an error in the excitation communication. For example, the CRC (Cyclic Redundancy Check) can be used for the error determination.

The controller 10 then transmits a stop bit after transmitting a signal for error determination to end the excitation communication described above.

Figure 6:
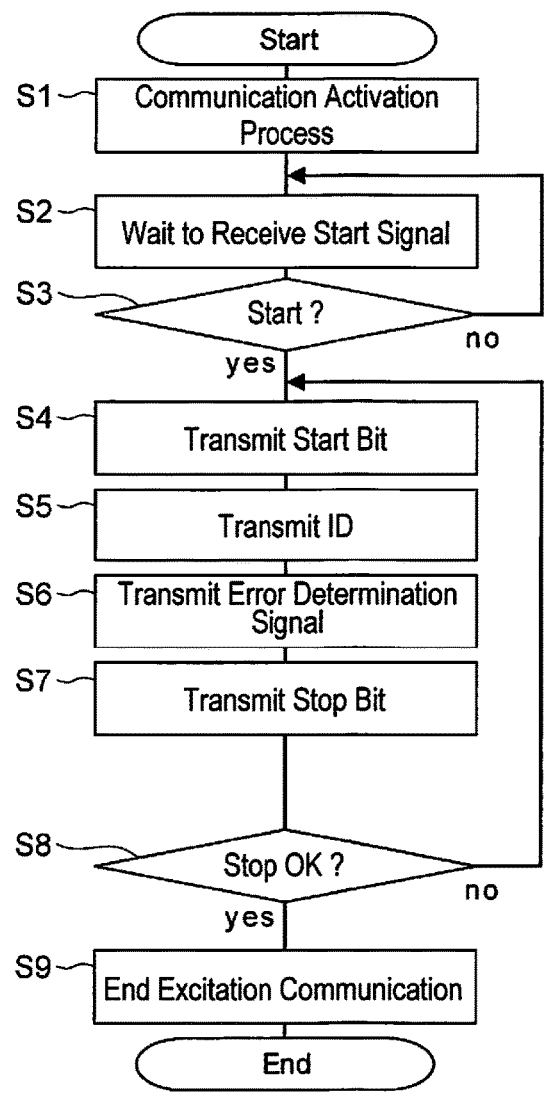
FIG. 6 is a flow chart illustrating the control procedure of the controller on the power supply device side in FIG. 1.

The control procedure of the controller 10 on the power supply device side will be described next, using FIG. 6. FIG. 6 is a flow chart illustrating the control procedure of the controller 10.

In step S1, the controller 10 activates at least the wireless communication unit 14. In step S2, the controller 10 waits in a state capable of receiving the start signal for excitation communication. In step S3, the controller 10 determines whether or not a start signal has been received.

If a start signal has been received, the controller 10 controls the power transmission circuit 12 and transmits a start bit, in step S4. In step S5, the controller 10 transmits encoded information corresponding to the individual information of the power supply device 1 by changing the number of pulses of the output current ($I_1$) in accordance with the encoded information and controlling the current value of the output current from the power transmission circuit 12 to the power transmission coil unit 11.

In step S6, the controller 10 transmits a signal for error determination by excitation communication. In step S7, the controller 10 transmits a stop bit. In step S8, the controller 10 determines whether or not a stop signal for the excitation communication has been received by the wireless communication unit 14. If a stop signal has not been received, the step proceeds to step S4.

On the other hand, if a stop signal has been received, the controller 10 ends the control of the excitation communication by ending the excitation communication and switching to a power supply control for charging the battery 23, in step S9.

Figure 7:
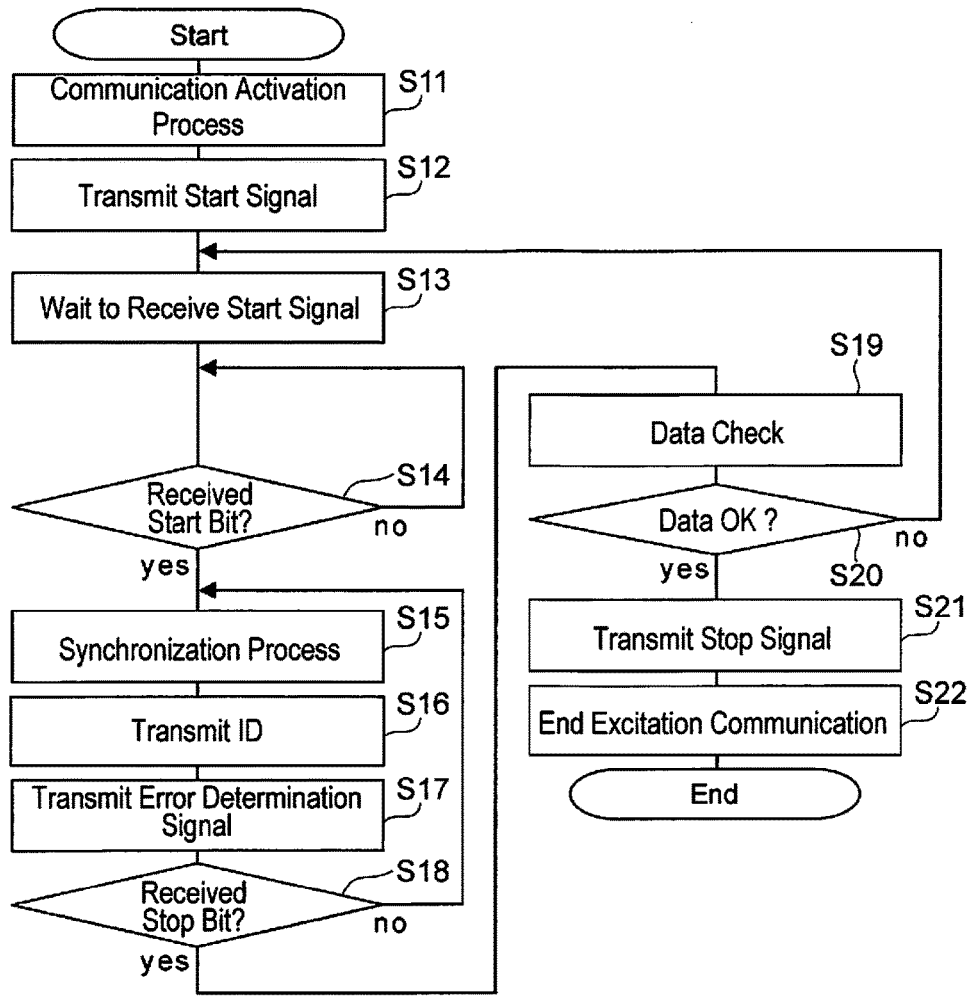
FIG. 7 is a flow chart illustrating the control procedure of the controller on the vehicle side in FIG. 1.

The control procedure of the controller 20 on the vehicle side will be described next, using FIG. 7. FIG. 7 is a flow chart illustrating the control procedure of the controller 20.

In step S11, the controller 20 activates at least the wireless communication unit 24. In step S12, the controller 20 transmits a start signal for starting the excitation communication by wireless communication. In step S13, the controller 20 erases the information that has been stored in the memory (for example, the information at the time of the previous non-contact power supply).

In step S14, the controller 20 determines whether or not a start bit has been received based on the detection value of the voltage sensor 25. If a start bit has been received, the controller 20 performs a synchronization step based on the timing that the start bit is received, in step S15. In step S16, the controller 20 receives the individual information of the power supply device 1 by acquiring an encoded value from the detection value of the voltage sensor 25.

In step S17, the controller 20 receives an error determination signal based on the detection value of the voltage sensor 25. In step S18, the controller 20 determines whether or not a stop bit has been received based on the detection value of the voltage sensor 25. If a stop bit has not been received, the step returns to step S15.

If a stop bit has been received, a data check for the received individual information of the power supply device 1 is performed by performing an error determination using the received error determination signal in step S19, and whether or not the data contains an error is determined in step S20. If the data does not contain an error, the step returns to step S13.

On the other hand, if the data does not contain an error, the controller 20 wirelessly transmits a stop signal to indicate stopping the excitation communication, in step S21. In step S22, the controller 20 ends the control of the excitation communication by ending the excitation communication and switching to a charging control for charging the battery 23.

As described above, the present embodiment receives encoded information by transmitting encoded information from the power transmission side to the power reception side and acquiring the encoded values from the detection values of the voltage sensor 25, by controlling the current value of the output current from the power transmission circuit 12 to the power transmission coil unit 11. The information of the power supply device 1 can thereby be sent from the power transmission side to the power reception side using a power transmission coil and a power reception coil for supplying power to the load in a non-contact manner. As a result, a dedicated communication circuit, such as a coil that is used only for communication, is not required.

In addition, the present embodiment acquires an encoded value by comparing the detection voltage that is detected by the voltage sensor 25 and a voltage threshold that is set in advance. The information that is transmitted from the power transmission side to the power reception side can thereby be received without providing a dedicated communication circuit, such as a coil that is used only for communication.

Figure 8:
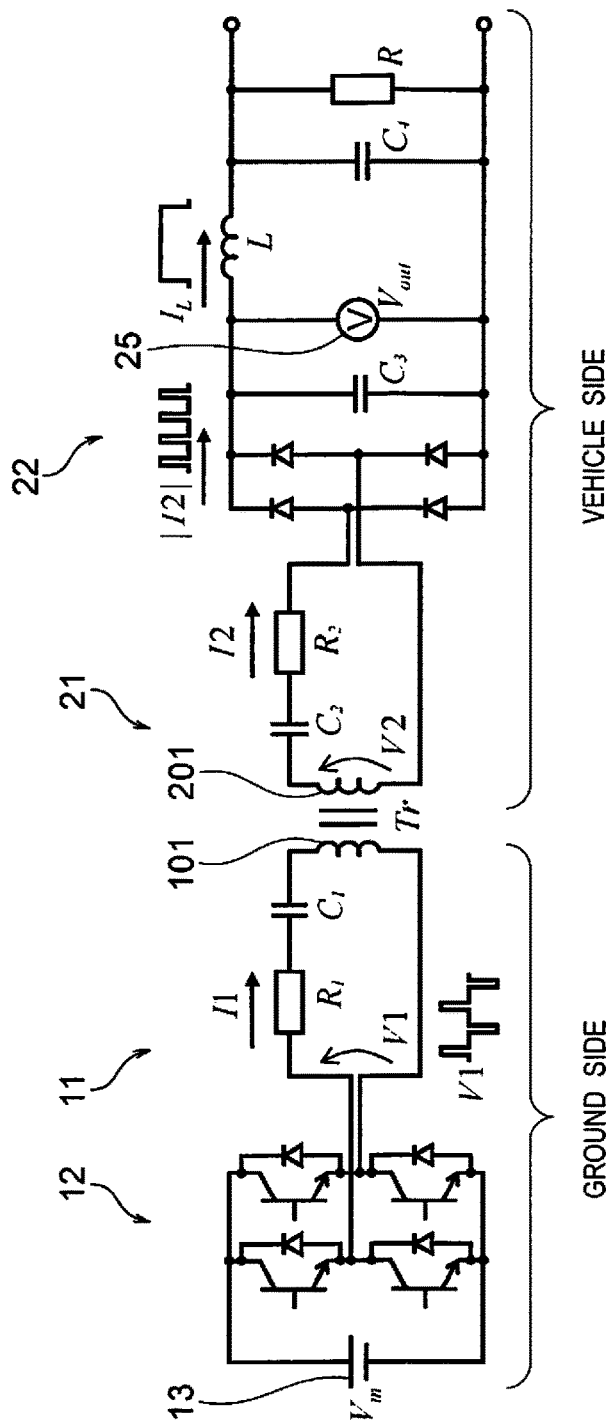
FIG. 8 is a circuit diagram of a non-contact power supply system according to a modified example of the present invention.

As a modified example of the present invention, the voltage sensor 25 may be connected on the input side of the coil (L) in parallel with respect to the capacitor ($C_3$), as illustrated in FIG. 8. Since the inductance of the coil (L) is determined in advance, the controller 20 may calculate the voltage of the capacitor ($C_4$) from the detection voltage of the voltage sensor 25 in FIG. 8.

Figure 9:
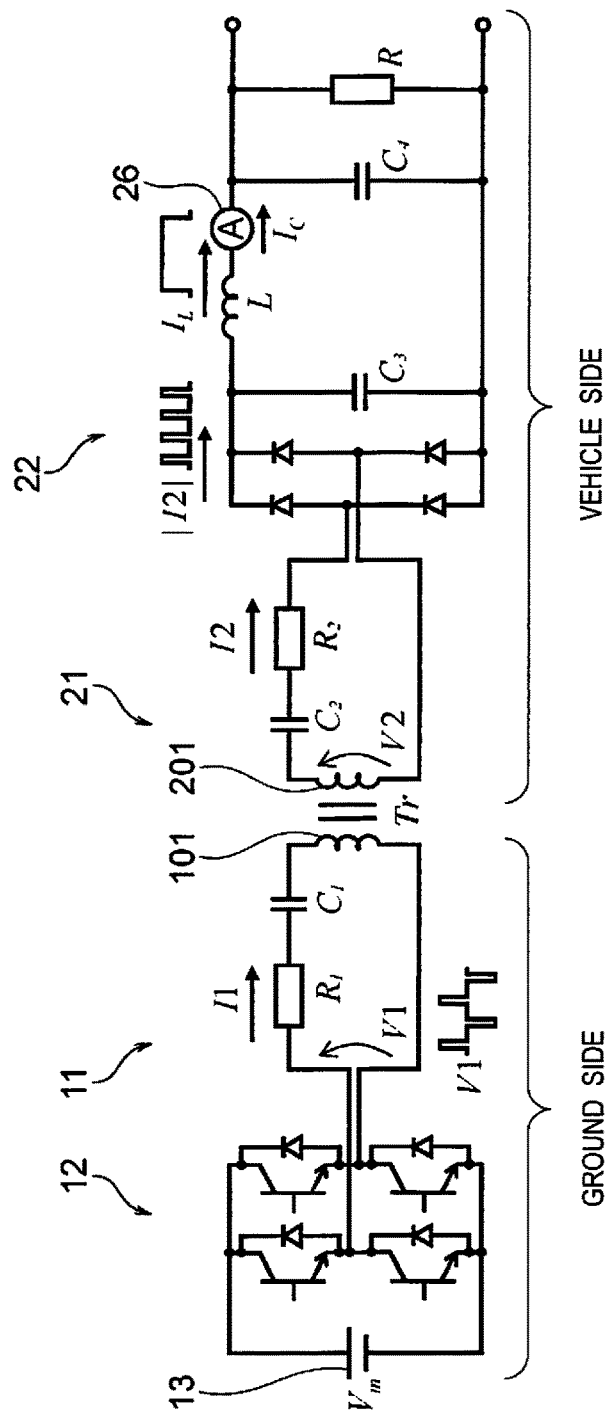
FIG. 9 is a circuit diagram of a non-contact power supply system according to a modified example of the present invention.

Additionally, as a modified example of the present invention, a current sensor 26 may be connected between the coil (L) and the capacitor ($C_4$) instead of the voltage sensor 25, as illustrated in FIG. 9. The controller 20 may calculate the voltage of the capacitor ($C_4$) by dividing the integrated value of the current value (Ic) of the current sensor 26 by the capacitance of the capacitor ($C_4$).

Figure 10:
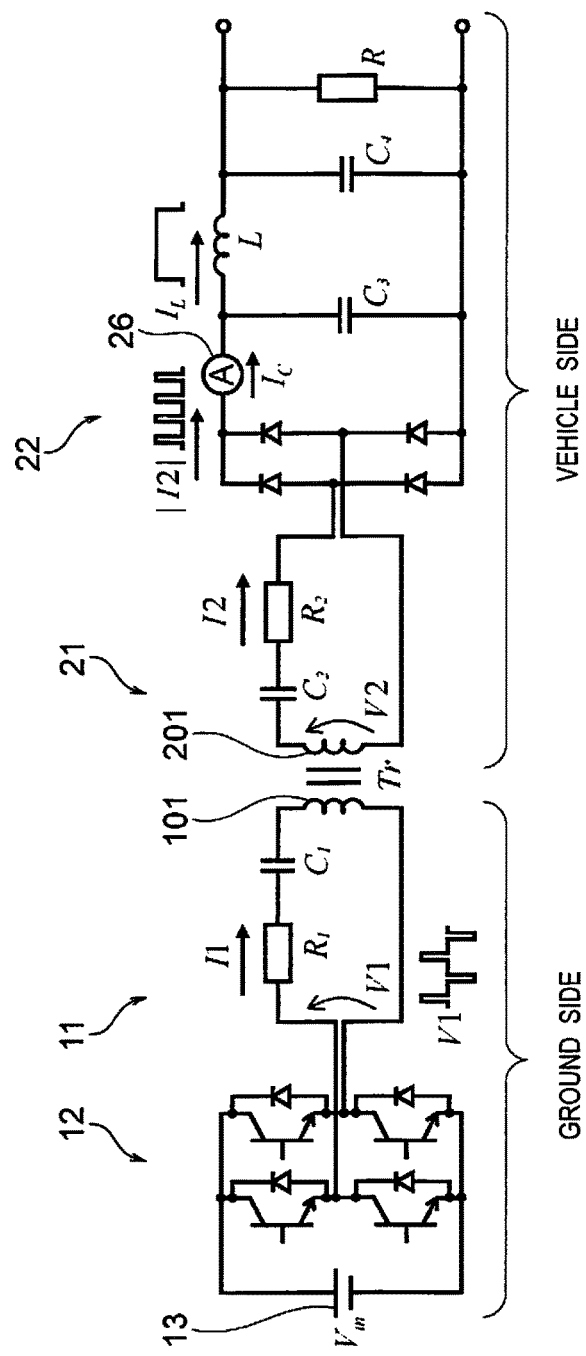
FIG. 10 is a circuit diagram of a non-contact power supply system according to a modified example of the present invention.

Additionally, as a modified example of the present invention, a current sensor 26 may be connected between the rectifier circuit 221 and the capacitor ($C_3$) instead of the voltage sensor 25, as illustrated in FIG. 10. The voltage of the capacitor (C3) may be calculated by dividing the integrated value of the current value (Ic) of the current sensor 26, by the capacitance of the capacitor ($C_3$). Then, the voltage of the capacitor ($C_4$) may be calculated from the voltage of the capacitor ($C_3$). FIGS. 8, 9 and 10 are circuit views of non-contact power supply systems according to modified examples of the present invention.

In the present embodiment, synchronization was achieved at the reception timing of the start bit; however, the controller 10 may, for example, flow an output current ($I_1$) of an encoded value "1111" before transmitting the encoded information corresponding to the individual information of the power supply device 1 as a preliminary operation. Then the controller 20 detects the cycle for synchronization and the synchronization timing from the detection timing of the voltage sensor 25. Synchronization can thereby be achieved in the present embodiment, even if a cycle for synchronization is not set in advance between the power transmission side and the power reception side.

The above-described primary coil 101 corresponds to the "power transmission coil" of the present invention, the secondary coil 201 corresponds to the "power reception coil" of the present invention, the power transmission circuit 12 corresponds to the "conversion means" of the present invention, the controller 10 corresponds to the "power transmission side controller" of the present invention, the power reception circuit 22 corresponds to the "smoothing circuit" of the present invention, and the controller 20 corresponds to the "power reception side controller" of the present invention.

Second Embodiment

Figure 11:
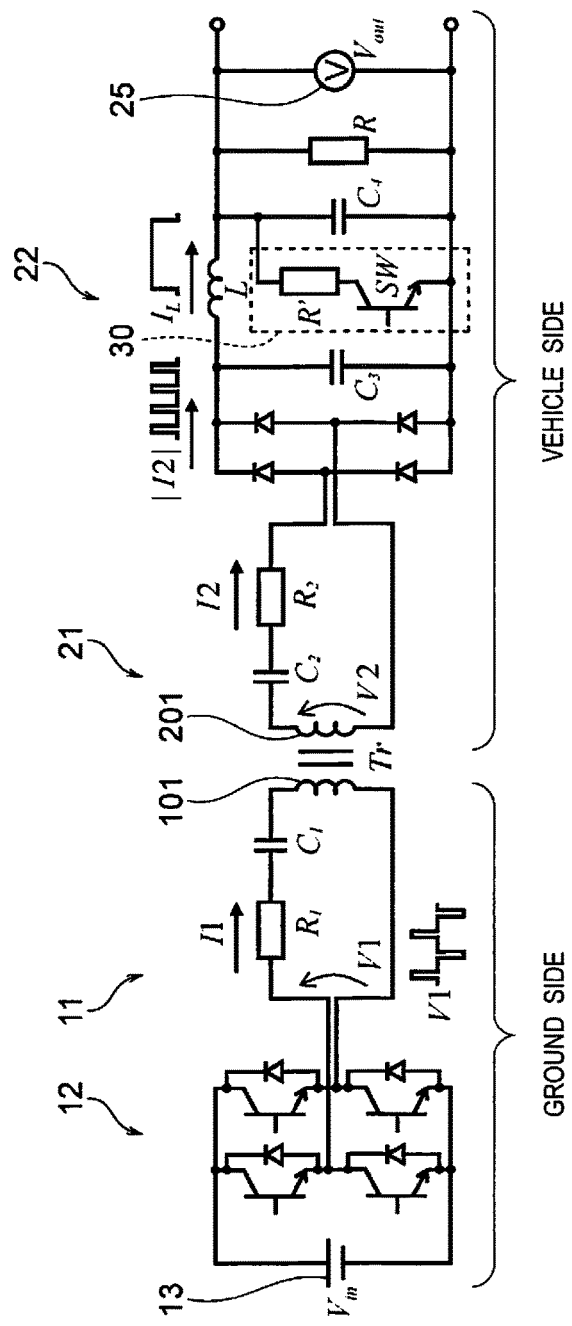
FIG. 11 is a circuit diagram of a non-contact power supply system according to another embodiment of the invention.

FIG. 11 is a circuit view of a non-contact power supply system according to another embodiment of the invention. The present embodiment is different from the first embodiment in the point that a discharge circuit 30 is provided. Since the other configurations are the same as the above-described first embodiment, the descriptions thereof are incorporated when appropriate.

The power reception circuit 22 comprises a discharge circuit 30 for discharging the electric charge of the capacitor ($C_4$), as illustrated in FIG. 11. The discharge circuit 30 is formed from a series circuit of a discharge resistor (R') and a switching element (SW). The discharge circuit 30 is connected in parallel with the capacitor ($C_4$). Then, the electric charge of the capacitor ($C_4$) is discharged when the switching element (SW) is turned ON with a control by the controller 20.

Figure 12:
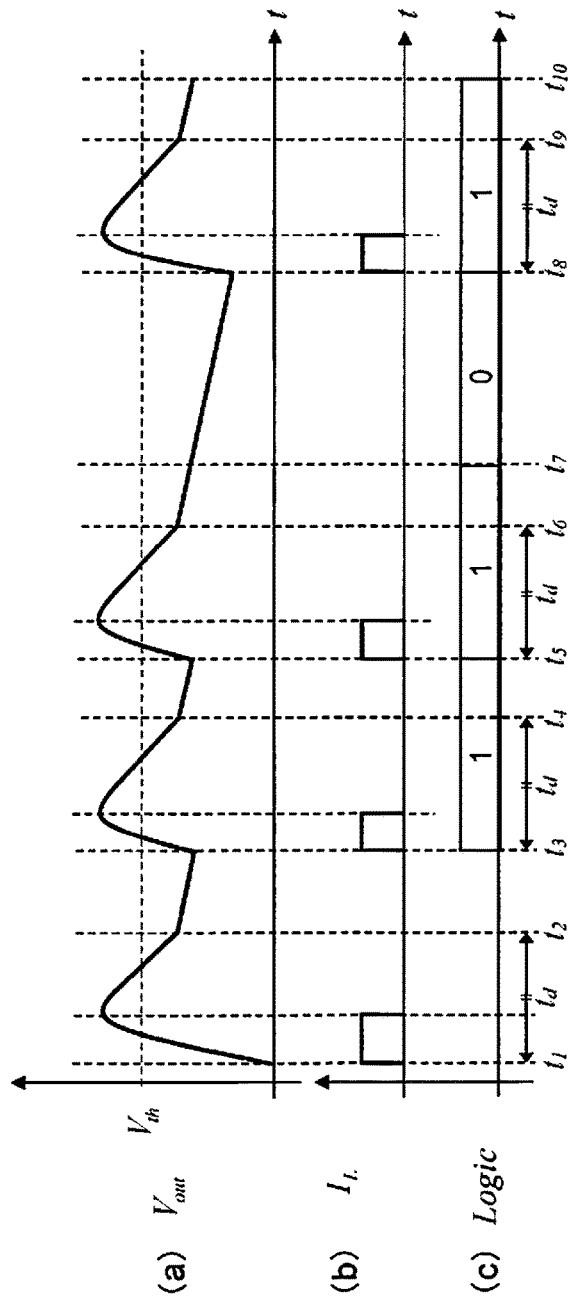
FIG. 12 is a series of graphs illustrating (a) the characteristics of the detection voltage of the voltage sensor, (b) the characteristics of the current that flows in the coil (L), and (c) the characteristics of the digital value that is determined based on the detection voltage, in the circuit view of FIG. 11.

The control of the controllers 10, 20 is described next, using FIG. 12. Since the method to transmit and receive the individual information of the power supply device 1 is the same as the first embodiment, the description thereof will be omitted. In FIG. 12, graph (a) is a graph illustrating the characteristics of the detection voltage of the voltage sensor 25, graph (b) is a graph illustrating the characteristics of the current that flows in the coil (L) of the filter 222, and graph (c) is a graph illustrating the characteristics of the digital value that is determined based on the detection voltage.

The controller 20 determines that a start bit has been detected when the detection voltage of the voltage sensor 25 becomes higher than 0 after transmitting a start signal for excitation communication by wireless communication. Then, the controller 20 synchronizes with the output cycle of the output current ($I_1$) based on the detection timing of the start bit (time ($t_1$) in FIG. 12) and acquires the encoded value.

In addition, the controller 20 synchronizes with the output cycle of the output current ($I_1$) or the acquisition cycle of the encoded value from the detection timing of the start bit (time ($t_1$) in FIG. 12) and turns the switching element (SW) ON.

The timing to turn the switching element (SW) ON is set to be a point in time in which time ($t_d$) has elapsed from periodic timings (time ($t_3$), time ($t_5$), and time ($t_8$)) that start at the detection timing of the start bit (time ($t_1$) in FIG. 12). Additionally, the acquisition timing for the encoded value is set to be a timing before time ($t_d$) has elapsed from the periodic timings (time ($t_3$), time ($t_5$), and time ($t_8$)).

Accordingly, the detection voltage of the voltage sensor 25 rises after time ($t_1$) by receiving the start bit, as illustrated in FIG. 12. The detection voltage of the voltage sensor 25 decreases after reaching a peak value due to the discharging of the capacitor ($C_4$) by the discharge resistor (R). Then, the controller 10 turns the switching element SW ON at the point in time in which time ($t_d$) has elapsed from time ($t_1$). The discharge rate of the capacitor ($C_4$) is increased by turning the switching element SW ON.

The controller 10 then turns the switching element SW OFF at the timing at which the detection voltage of the voltage sensor 25 rises.

After time ($t_3$), the detection voltage of the voltage sensor 25 rises and falls again. The controller 20 turns the switching element SW ON at the point in time (time ($t_4$) in which time ($t_d$) has elapsed from time ($t_3$). Then, the discharge rate of the capacitor ($C_4$) is increased by turning the switching element SW ON.

That is, in the present embodiment, the discharge time of the capacitor ($C_4$) is shortened by controlling and synchronizing the switching element SW included in the discharge circuit 30 with the output cycle of the output current ($I_1$). The voltage of the capacitor ($C_4$) that has become higher than the voltage threshold ($V_{th}$) can be decreased to the voltage threshold ($V_{th}$) or lowered more quickly, by the amount that the discharge time of the capacitor ($C_4$) is shortened. Accordingly, the output cycle of the output current ($I_1$) can be shortened compared to the first embodiment. As a result, the communication speed of the excitation communication can be increased.

As described above, the present embodiment controls the switching element SW in correspondence with the timing to output the output current ($I_1$). The communication speed of the excitation communication can thereby be increased, by quickly discharging the capacitor.

Figure 13:
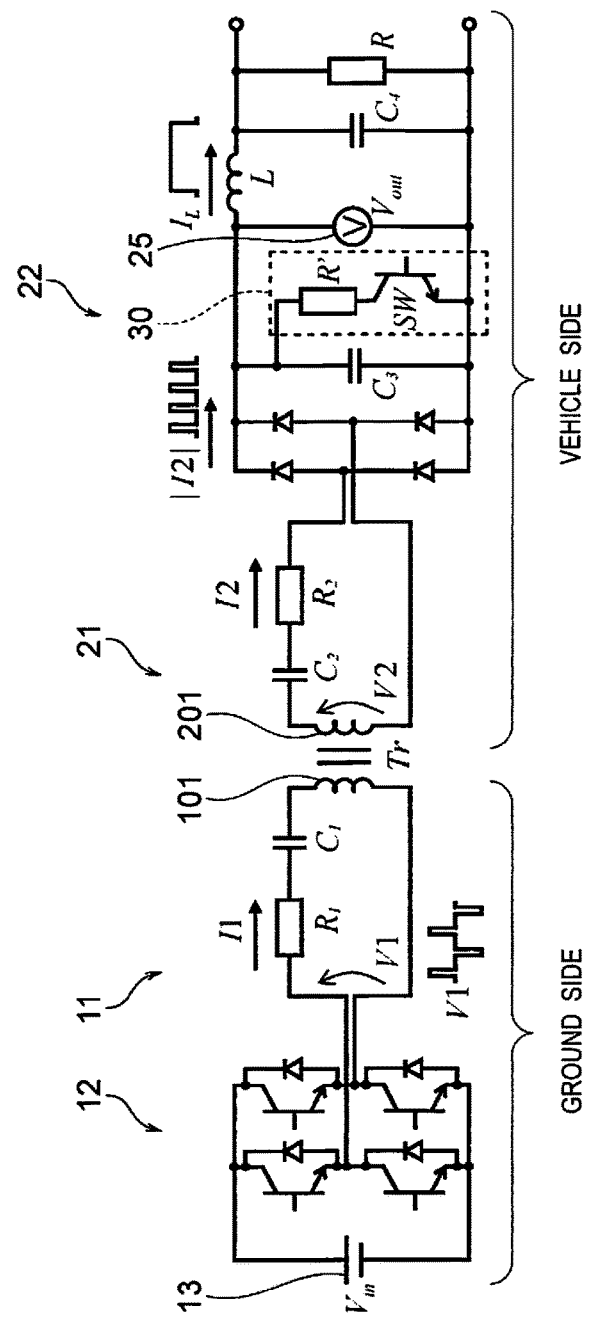
FIG. 13 is a circuit diagram view of a non-contact power supply system according to a modified example of the present invention.

As a modified example of the present invention, the voltage sensor 25 may be connected in parallel with the capacitor ($C_3$), and the discharge circuit 30 for discharging the electric charge of the capacitor ($C_3$) may be connected in parallel with respect to the capacitor ($C_3$), as illustrated in FIG. 13. FIG. 13 is a circuit view of a non-contact power supply system according to a modified example of the present invention.

Third Embodiment

Figure 14:
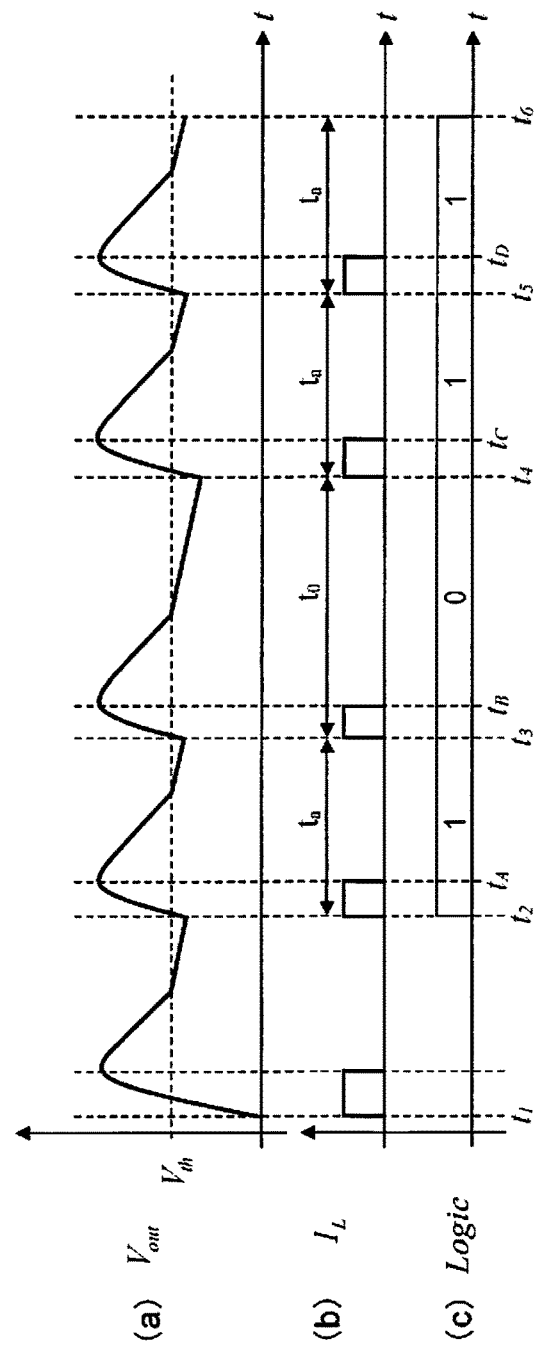
FIG. 14 is a series of graphs illustrating (a) the characteristics of the detection voltage of the voltage sensor, (b) the characteristics of the current that flows in the coil (L), and (c) the characteristics of the digital value that is determined based on the detection voltage, in the non-contact power supply system according to another embodiment of the invention.

In FIG. 14, a series of graphs illustrates: the characteristics of the detection voltage ($V_{out}$) of the voltage sensor 25 (graph (a) of FIG. 14); the characteristics of the current that flows in the coil (L) (graph (b) of FIG. 14); and the characteristics of the digital value that is determined based on the detection voltage (graph (c) of FIG. 14), in the non-contact power supply system according to another embodiment of the invention. The present embodiment is different from the above-described second embodiment in the method for acquiring the encoded value. The other configurations are the same as the above-described second embodiment, and the descriptions of the first and second embodiments are incorporated when appropriate. The circuit configuration of the non-contact power supply system according to the present embodiment shall be the circuit illustrated in FIG. 11.

The controller 10 outputs a current so that the waveform of the output current ($I_1$) will be a plurality of intermittent pulses, whether the encoded information is a "0" or a "1,"

but changes the time for outputting. The controller 10 sets the output interval of the output current ($I_1$) to time ($t_a$), when transmitting the encoded information "1", and sets the output interval of the output current ($I_1$) to time ($t_0$), when transmitting the encoded information "0." Time ($t_0$) is set to be longer than time ($t_a$).

In addition, the output interval of the output current ($I_1$) is the time elapsed from when outputting the pulses of the output current ($I_1$) to when outputting the pulses of the next output current ($I_1$). For example, when outputting six pulses as the output current ($I_1$), the output interval of the output current ($I_1$) will be the time elapsed from the output timing of the previous six pulses to the output timing of the next six pulses.

The controller 20 detects the point in time when the detection voltage rises from the detection voltage of the voltage sensor 25 after receiving the start bit signal. The rise of the detection voltage is detected by, for example, calculating the difference between the previous detection value of the voltage sensor and the current detection value of the voltage sensor.

The controller 20 detects the start bit by detecting that the detection voltage ($V_{out}$) is higher than zero at the point in time of time ($t_1$), as illustrated in FIG. 14. Then, the controller 20 detects the point in time ($t_2$) of the rise of the detection voltage after the point in time of time ($t_1$), from the detection voltage of the voltage sensor 25. In the same way, the controller 10 detects the point in time of each rise of the detection voltage, at the points in time of time ($t_3$)-time ($t_6$).

The power supply device side controller 10 outputs a current corresponding to the encoded information "1011" from the power transmission circuit 12 to the power transmission coil unit 11. Accordingly, the output time corresponding to "1," i.e., the output time from time ($t_2$) to time ($t_3$), the output time from time ($t_4$) to time ($t_5$), and the output time from time ($t_5$) to time ($t_6$), will be shorter than the output time from time ($t_3$) to time ($t_4$).

The controller 20 measures the elapsed time between the point in time of the previous rise to the point in time of the current rise, from the points in time of each rise of the detection voltage. That is, in the example of FIG. 14, the controller 10 calculates the elapsed time ($t_a$) from time ($t_2$) to time ($t_3$), the elapsed time from time ($t_4$) to time ($t_5$), and the elapsed time from time ($t_5$) to time ($t_6$) as time ($t_a$), and calculates the elapsed time from time ($t_3$) to time ($t_4$) as time ($t_0$).

A time threshold ($t_{th}$) for identifying the encoded information is set in advance in the controller 20. Then, the controller 20 identifies the start bit and the encoded information by comparing the measured elapsed time and the time threshold ($t_{th}$). The controller 20 determines the encoded value as "0" when the measured elapsed time is longer than the time threshold ($t_{th}$), and determines the encoded value as "1" when the measured elapsed time is equal to or less than the time threshold ($t_{th}$).

In the example of FIG. 14, the controller 20 acquires the encoded value "0" by detecting that the elapsed time ($t_0$) is longer than the time threshold ($t_{th}$), and acquires the encoded value "1" by detecting that the elapsed time ($t_a$) is shorter than the time threshold ($t_{th}$). The controller 20 thereby can acquire the encoded value "1011."

As described above, the present embodiment receives information by transmitting information from the power transmission side to the power reception side and acquiring the encoded values from the detection values of the voltage sensor 25, by controlling the output time of the output current from the power transmission circuit 12 to the power transmission coil unit 11. The information of the power supply device 1 can thereby be sent from the power transmission side to the power reception side using a power transmission coil and a power reception coil for supplying power to the load in a non-contact manner. As a result, a dedicated communication circuit, such as a coil that is used only for communication, is not required.

In addition, if the encoded value is identified from the magnitude of the voltage, as in the first embodiment, there is the possibility that a sufficiently high voltage cannot be detected on the power reception side if the coupling between the primary coil 101 and the secondary coil 201 is not good. Since the encoded value is identified based on time in the present embodiment, the information can be received even if the coupling between the coils is poor and only a low voltage can be detected on the power reception side.

In addition, in the present embodiment, the encoded value is acquired by measuring the elapsed time included between the point in time of the previous rise in the detection voltage that is detected by the voltage sensor 25 and the point in time of the current rise in the detection voltage, and comparing the elapsed time and a time threshold ($t_{th}$) that is set in advance. The information that is transmitted from the power transmission side to the power reception side can thereby be received without providing a dedicated communication circuit, such as a coil that is used only for communication.

In the present embodiment, the encoded value is acquired based on the interval of the rise times of the detection voltage; however, as a modified example of the present invention, the encoded value may be acquired based on the discharge time of the capacitor ($C_4$). As the characteristics illustrated in FIG. 14, the discharge time corresponds to the time from times ($t_A$)-($t_D$), which correspond to the peak value of the detection voltage ($V_{out}$), to times ($t_3$)-($t_6$). The peak value of the detection voltage ($V_{out}$) can be detected from the difference between the previous detection value and the current detection value of the voltage sensor 25.

Then, the discharge time becomes longer as the output interval of the output current ($I_1$) becomes longer. The controller 20 thereby acquires the encoded value by measuring the discharge time of the capacitor ($C_4$) based on the detection value of the voltage sensor 25 and comparing the discharge time and a discharge time threshold that is set in advance. The information that is transmitted from the power transmission side to the power reception side can thereby be received without providing a dedicated communication circuit, such as a coil, that is used only for communication. The discharge time threshold is a threshold for identifying the encoded information, similar to the time threshold ($t_{th}$) described above, and is a value that is set in advance.

In the present embodiment, each of the elapsed times from times ($t_A$)-($t_D$) to times ($t_3$)-($t_6$) may be measured, instead of the elapsed time ($t_a$) from time ($t_2$) to time ($t_3$), the elapsed time (ta) from time ($t_4$) to time ($t_5$), the elapsed time from time ($t_5$) to time ($t_6$), and the elapsed time from time ($t_3$) to time ($t_4$).

Figure 15:
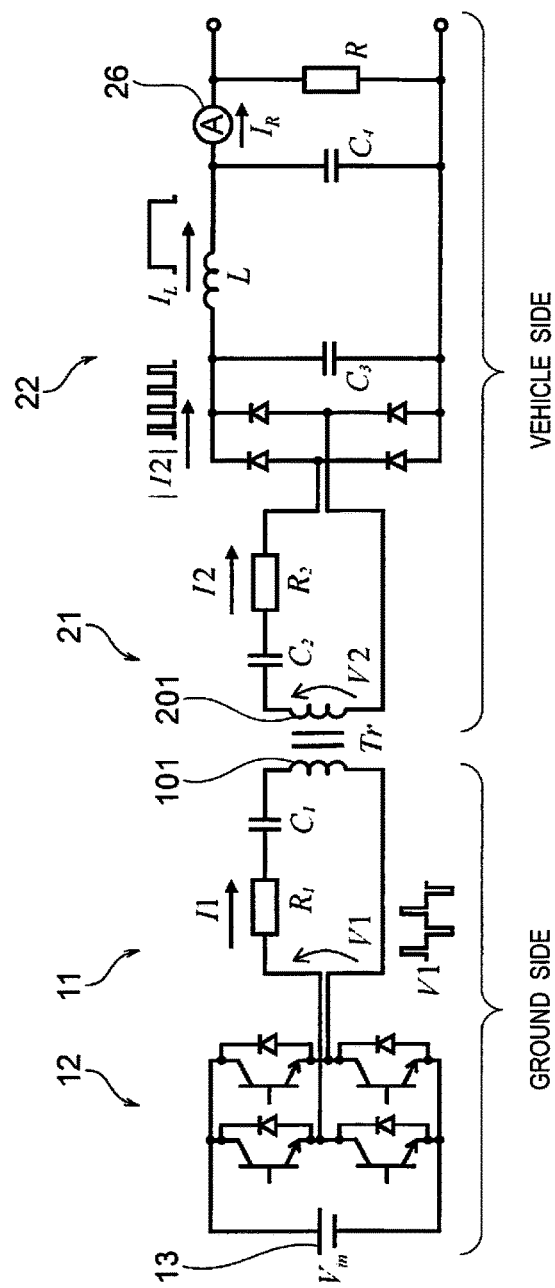
FIG. 15 is a circuit diagram a non-contact power supply system according to a modified example of the present invention.

As a modified example of the present invention, a current sensor 26 may be connected between the capacitor (C4) and the discharge resistor (R) instead of the voltage sensor 25, and the discharge time may be measured from the detection current of the current sensor 26, as illustrated in FIG. 15.

Fourth Embodiment

Figure 16:
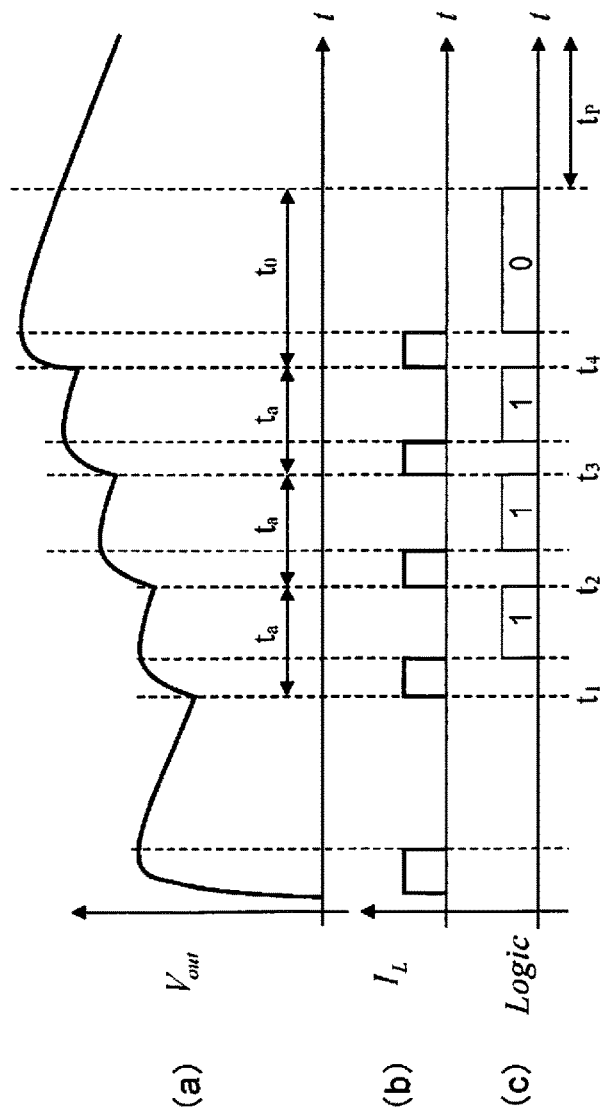
FIG. 16 is a series of graphs illustrating (a) the characteristics of the detection voltage of the voltage sensor, (b) the characteristics of the current that flows in the coil (L), and (c) the characteristics of the digital value that is determined based on the detection voltage, in the non-contact power supply system according to another embodiment of the invention.

In FIG. 16, a series of graphs illustrates: the characteristics of the detection voltage ($V_{out}$) of the voltage sensor 25 (graph (a) of FIG. 16); the characteristics of the current that flows in the coil (L) (graph (b) of FIG. 16); and the characteristics of the digital value that is determined based on the detection voltage (graph (c) of FIG. 16), in the non-contact power supply system according to another embodiment of the invention. The present embodiment is different from the above-described first embodiment in the method for acquiring the encoded value. The other configurations are the same as the above-described first embodiment, and the descriptions of the first to the third embodiments are incorporated when appropriate. The circuit configuration of the non-contact power supply system according to the present embodiment is the circuit illustrated in FIG. 2.

The controller 10 controls the power transmission circuit 12 so that the output interval of the output current ($I_1$) will be time ($t_a$) or time ($t_0$), in the same way as the third embodiment. Time ($t_0$) is set to be longer than time ($t_a$).

The controller 20 detects the point in time when the detection voltage rises from the detection voltage of the voltage sensor 25 after receiving the start bit signal and measures the elapsed time, which is the interval of the rise times.

In the example illustrated in FIG. 16, the controller 20 measures an elapsed time (to) that is longer than the time threshold ($t_{th}$), after measuring an elapsed time ($t_a$) that is shorter than the time threshold ($t_{th}$) three times. Then, the controller 20 acquires the encoded value "1110" by comparing the measured elapsed time and the time threshold ($t_{th}$).

Figure 17:
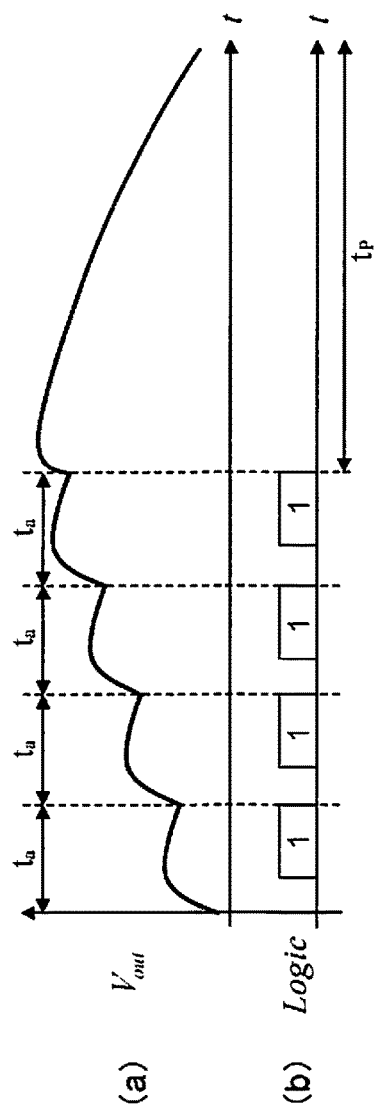
FIG. 17 is a series of graphs illustrating (a) the characteristics of the detection voltage of the voltage sensor, and (b) the characteristics of the digital value that is determined based on the detection voltage, in the non-contact power supply system according to another embodiment of the invention.
Figure 18:
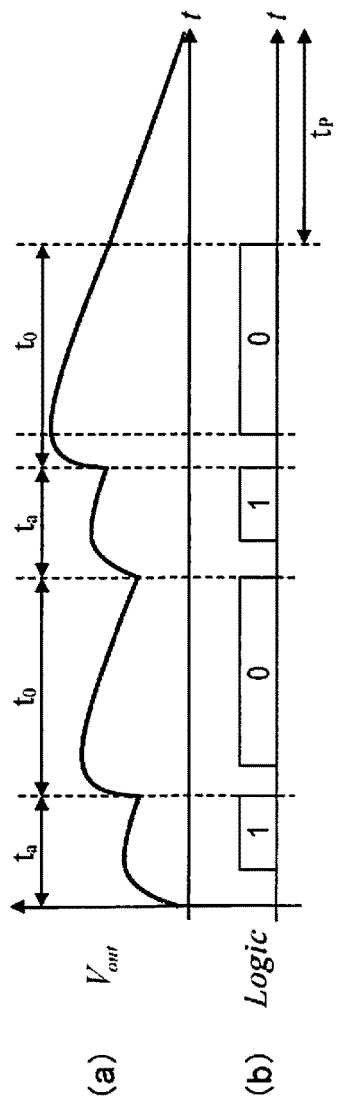
FIG. 18 is a series of graphs illustrating (a) the characteristics of the detection voltage of the voltage sensor, and (b) the characteristics of the digital value that is determined based on the detection voltage, in the non-contact power supply system according to another embodiment of the invention.

As another example of an encoded value, when transmitting "1111" from the power supply side to the vehicle side, the detection voltage ($V_{out}$) transitions with respect to the voltage threshold ($V_{th}$) as illustrated in FIG. 17. Additionally, when transmitting "1010" from the power supply side to the vehicle side, the detection voltage ($V_{out}$) transitions with respect to the voltage threshold ($V_{th}$) as illustrated in FIG. 18. Graph (a) of FIG. 16 and graph (a) of FIG. 17 are graphs illustrating the characteristics of the detection voltage of the voltage sensor 25, and graph (b) of FIG. 16 and graph (b) of FIG. 17 are graphs illustrating the characteristics of the digital value that is determined based on the detection voltage.

The difference from the first embodiment is that the controller shortens the output interval of the intermittent pulses, which is the output current ($I_1$). Accordingly, charging based on the output current ($I_1$) is started before the electric charge of the capacitor ($C_4$) is fully discharged. The discharge time of the capacitor ($C_4$) can thereby be shortened, and the communication speed of the excitation communication can be increased.

On the other hand, the detection voltage ($V_{out}$) of the voltage sensor 25 gradually rises in the order of time ($t_1$) to time ($t_4$). Accordingly, in order to prevent the capacitor ($C_4$) from becoming overcharged, the controller 20 sets a discharge period ($t_p$) for decreasing the voltage of the capacitor ($C_4$) after acquiring the encoded value. In particular, the peak voltage of the capacitor ($C_4$) will be high if the encoded value is "1111," but the present embodiment can prevent an overcharge of the capacitor ($C_4$) by setting a discharge period ($t_p$). When connecting a discharge circuit 30, the discharge period ($t_p$) corresponds to the ON time of the switching element SW, as illustrated in FIG. 11.

As described above, in the present embodiment, the discharge time of the capacitor ($C_4$) is set after acquiring the encoded value on the power reception side. The capacitor ($C_4$) can thereby be prevented from overcharging.

As a modified example of the present invention, the controller 10 may control the output time of the output current ($I_1$) so that the output intervals of the output current ($I_1$) are divided four ways, and so that each output interval represents 2-bit of information. The controller 20 acquires 2-bit of encoded values by comparing the interval of the rise times of the detection voltage corresponding to the four output intervals and the voltage threshold.

Figure 19:
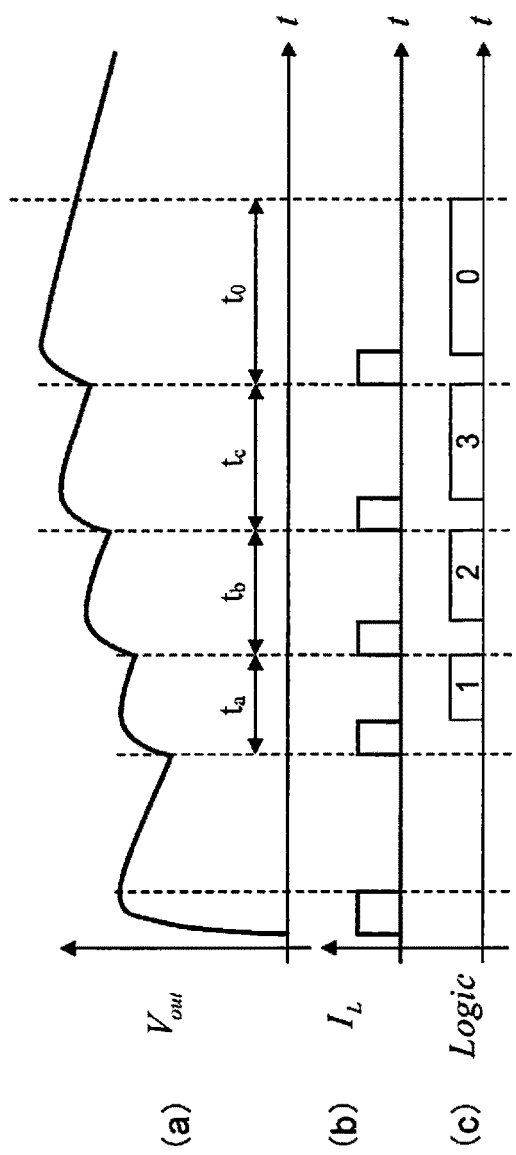
FIG. 19 is a series of graphs illustrating (a) the characteristics of the detection voltage of the voltage sensor, and (b) the characteristics of the digital value that is determined based on the detection voltage, in the non-contact power supply system according to a modified example of the invention.

The characteristics according to a modified example of the present invention is illustrated in FIG. 19. In FIG. 19, graph (a) illustrates the characteristics of the detection voltage ($V_{out}$) of the voltage sensor 25, graph (b) illustrates the characteristics of the current that flows in the coil (L), and graph (c) illustrates the characteristics of the digital value that is determined based on the detection voltage.

The controller 20 measures the intervals $t_a$, $t_b$, $t_c$, $t_0$, of the rise times of the detection voltage, based on the detection value of the voltage sensor 25, as illustrated in graph (a) of FIG. 19. Then, the controller 20 is able to acquire values represented by 2-bit information "00(0)," "01(1)," "10(2)," and "11(3)," by comparing the measured elapsed times ($t_a$, $t_b$, $t_c$, $t_0$) and the time threshold. The present embodiment is not limited to 2 bits; information can be transmitted by excitation communication by converting to multi-bits.

What is claimed is:

1. A non-contact power supply system comprising:
   a power transmission coil;
   a conversion circuit configured to convert power of a transmission side power source and output the power to the power transmission coil;
   a power transmission side controller configured to control the conversion circuit, the power transmission side controller being configured to transmit an encoded value by controlling the conversion circuit to output a current pulse to the power transmission coil;
   a power reception coil configured to supply power to an electrically connected load by receiving power from the power transmission coil in a non-contact manner by at least a magnetic coupling;
   a smoothing circuit configured to smooth the power that is received by the power reception coil;
   a sensor configured to detect one of a current that flows in the smoothing circuit and a voltage of the smoothing circuit; and
   a power reception side controller configured to receive information from the power transmission side controller by acquiring the encoded value based on a detection value of the sensor,
   the power reception side controller being configured to acquire the encoded value by
      measuring an elapsed time included between a point in time of a previous rise in the detection value of the sensor and a point in time of a current rise in the detection value, and
      comparing the elapsed time and an elapsed time threshold that is set in advance.

2. The non-contact power supply system according to claim 1, further comprising
   a discharge circuit configured to discharge a capacitor of the smoothing circuit, the discharge circuit having a switching element, and
   the power reception side controller being configured to control the switching element in correspondence with an output timing of the current pulse by the conversion circuit.

3. The non-contact power supply system according to claim 2, wherein the power reception side controller is configured to initiate discharging of the capacitor for a discharging period after acquiring the encoded value.

4. The non-contact power supply system according to claim 1, wherein
the smoothing circuit comprises a capacitor, and
the power reception side controller is configured to initiate discharging of the capacitor for a discharging period after acquiring the encoded value.

5. The non-contact power supply system according to claim 1, wherein
the power transmission side controller is configured to control the conversion circuit to output a plurality of the current pulses intermittently to the power transmission coil, and
the power reception side controller is configured to measure an interval of the current pulses as the elapsed time.

6. The non-contact power supply system according to claim 5, wherein
the power transmission side controller is configured to control the interval of the current pulses to a longer interval or a shorter interval to indicate 1's and 0's.

7. The non-contact power supply system according to claim 6, wherein
the power transmission side controller is configured such that the longer interval indicates a 0 and the shorter interval indicates a 1.

* * * * *